Jan. 16, 1923.
B. T. WILSON.
Brace for Tractor Plows.
Filed Mar. 1, 1922.
1,442,505
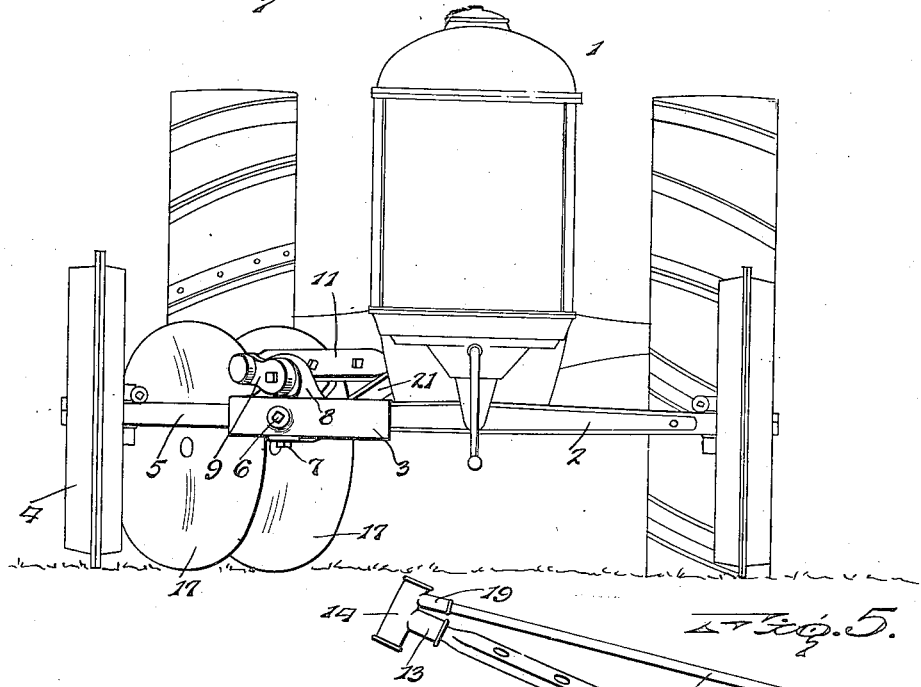
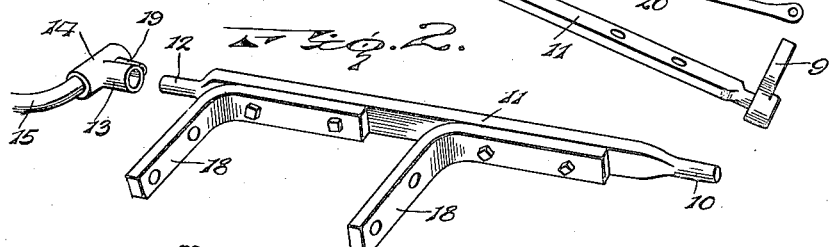
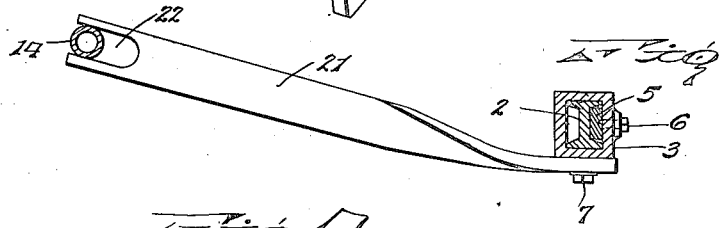
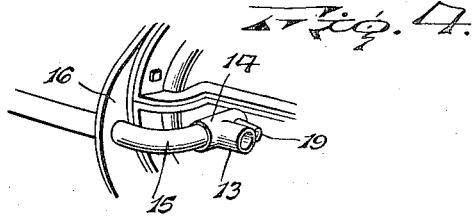
Inventor
Ben T. Wilson.
By Lacey & Lacey, Attorneys Patented Jan. 16, 1923.

1,442,505

UNITED STATES PATENT OFFICE.

BEN T. WILSON, OF NACOGDOCHES, TEXAS.

BRACE FOR TRACTOR PLOWS.

Application filed March 1, 1922. Serial No. 540,354.

*To all whom it may concern:*

Be it known that I, BEN T. WILSON, a citizen of the United States, residing at Nacogdoches, in the county of Nacogdoches and State of Texas, have invented certain new and useful Improvements in Braces for Tractor Plows, of which the following is a specification.

There has recently come into use a plow attachment for tractors which is mounted directly upon the side of the tractor so as to work in advance of one of the rear tractor wheels. The front axle of the tractor is connected with a stub axle by an extension coupling or box and the front tractor wheel is carried by the said stub axle, a diagonally disposed beam being disposed between the extension coupling or box and a supporting bar held at its front end by a plate on the rear end of the tractor crank case and secured at its rear end to the tractor draw bar. This diagonal beam carries the plows and their mountings and in actual use has been found to sufficiently prevent rearward bending of the outer end of the axle or of the stub axle. There is, however, a tendency of the front axle, the stub axle, and the extension coupling to twist rearwardly at their under sides, and it is the primary object of my present invention to overcome this tendency so that the axle will be held rigid and the tractor wheel be held to its true path. This object I attain in the use of such a device as is illustrated in the accompanying drawings, and the invention resides in certain novel features which will be particularly pointed out in the appended claims.

In the drawings—

Figure 1 is a front end elevation of the tractor plow having my improvement applied thereto;

Fig. 2 is an enlarged detail perspective view of the diagonal beam and its rear support;

Fig. 3 is a view partly in section and partly in elevation showing the improvement;

Fig. 4 is a detail view showing the manner in which the device is connected with the rear end of the crank case;

Fig. 5 is a plan view of another form of the invention.

The tractor 1 is illustrated conventionally and is of a well-known type. In mounting the above referred to plow upon the tractor, the front axle 2 is equipped with a coupling or extension box 3 and the tractor wheel 4 is carried by a stub axle 5 which is secured in the outer end of said extension or coupling box by a set screw 6 mounted in the front side of the coupling and clamping the stub axle to the main axle, as will be readily understood upon reference to Fig. 3, the coupling being secured upon the main axle by bolt 7 passed vertically through the axle and the coupling. The coupling or extension box 3 is provided upon its upper side with a post or lug 8 to which is secured a bearing block 9 which may be pivotally adjusted. The block 9 receives the reduced circular front end 10 of a beam 11, which extends diagonally rearward from the block and has its circular rear end 12 fitted in a socket or bearing 13 forming a part of a T-fitting 14 which is mounted on the supporting bar 15. Said supporting bar 15 is carried adjacent its front end by a bracket or plate 16 secured rigidly to the flange of the tractor crank case, the bar 15 extending rearwardly and being secured at its rear end to the tractor draw bar. The plows 17 are carried by brackets 18 which are secured to the beam 11, and it will be readily noted that the said beam may rock in its bearings so that the plows may be easily raised or lowered by manipulation of a hand lever (not shown).

In carrying out my invention, in the form illustrated in Fig. 5, I provide an additional socket 19 on the T-fitting 14 between the socket 13 and the side of the tractor, and in the said socket, I engage the rear end of a brace rod 20 which has its front end projected under the axle extension or coupling box 3 and secured thereto by the bolt 7. The tendency of the axle to rotate about its own longitudinal axis so that it will twist rearwardly at its under side is overcome by the provision of this brace bar so that the axle will remain rigidly at its work, although relative play between the bar 15 and the axle will be permitted, this result being due to the stiffness of the brace rod and the end thrust resistance of the rod after all the play of the rod in the socket 19 has been taken up.

In the form of the invention shown in Fig. 3, the brace bar comprises a metallic bar or strap 21 having its front end secured rigidly to the under side of the coupling box 3 by the bolt 7 and its rear end provided with a longitudinal notch or slot 22 adapted to engage over the fitting 14 or the bar 15. A slight play longitudinally of the brace upon the fitting is thus permitted while at the same time the thrust upon the axle is effectually counteracted. In actual practice, I have made the notch 22 of such length that its base is never touched by the fitting 14 or the bar 15 and have employed a brace bar of such dimensions that its stiffness accomplishes the desired results. This form of the invention is advantageous in working on very uneven ground as, under such circumstances, it is very desirable to have ample play in the notch or slot.

In both forms of the invention, the construction is exceedingly simple and the device may be applied to the implements now in use as well as to subsequently manufactured implements at a very low cost while it will increase the value and efficiency of the implement by preventing the twisting of the front axle.

Having thus described the invention, what is claimed as new is:

1. In an agricultural implement of the class described, the combination with a tractor having a front axle, a frame bar upon the tractor, and an implement-carrying beam supported by said axle and said frame bar, of a brace having its front end secured rigidly to the under side of the tractor axle and its rear end provided with a longitudinal notch engaging said frame bar adjacent the rear end of said beam.

2. The combination with an agricultural machine comprising a tractor having a front axle, a stub axle, an extension coupling connecting the front axle and the stub axle, a frame bar supported by the rear portion of the tractor, and an implement-carrying beam supported by the coupling and the frame bar, of a rigid brace bar fixed at its front end to the under side of the coupling and loosely supported at its rear end upon the frame bar.

In testimony whereof I affix my signature.

BEN T. WILSON. [L. S.]